(12) United States Patent
Ravishankar et al.

(10) Patent No.: US 7,574,487 B1
(45) Date of Patent: Aug. 11, 2009

(54) MESSAGING SYSTEM CONFIGURED FOR SELECTIVELY ACCESSING SUBSCRIBER SPOKEN NAME FROM A DIRECTORY SERVER BASED ON DETERMINED UNAVAILABILITY OF MESSAGING SERVER

(75) Inventors: Geetha Ravishankar, Glen Allen, VA (US); Satish Joshi, Glen Allen, VA (US); Nagendran Parasu, Richmond, VA (US); Zhiwei Zhang, Richmond, VA (US)

(73) Assignee: Cisco Technology, Inc., San Jose, CA (US)

( * ) Notice: Subject to any disclaimer, the term of this patent is extended or adjusted under 35 U.S.C. 154(b) by 1574 days.

(21) Appl. No.: 09/820,884

(22) Filed: Mar. 30, 2001

(51) Int. Cl.
*G06F 15/16* (2006.01)

(52) U.S. Cl. .............. 709/219; 709/217; 379/88.13; 379/88.17; 379/88.22; 379/88.23; 379/265.09

(58) Field of Classification Search ......... 709/227–229, 709/217–219; 455/413; 379/1.01, 1.02, 379/9.05, 88.17–88.23, 142.01–142.06, 88.16, 379/88.27
See application file for complete search history.

(56) References Cited

U.S. PATENT DOCUMENTS

| 4,837,798 | A |   | 6/1989  | Cohen et al. |
|-----------|---|---|---------|--------------|
| 5,138,311 | A | * | 8/1992  | Weinberg ............... 340/7.28 |
| 5,608,786 | A | * | 3/1997  | Gordon ................... 709/206 |
| 5,717,741 | A |   | 2/1998  | Yue et al. |
| 6,021,181 | A | * | 2/2000  | Miner et al. ............ 379/88.23 |
| 6,134,313 | A | * | 10/2000 | Dorfman et al. ........ 379/88.22 |
| 6,229,878 | B1 | * | 5/2001 | Moganti ................. 379/88.22 |
| 6,230,190 | B1 | * | 5/2001 | Edmonds et al. ........ 709/213 |
| 6,233,318 | B1 | * | 5/2001 | Picard et al. ........... 379/88.17 |
| 6,263,064 | B1 | * | 7/2001 | O'Neal et al. .......... 379/201.03 |
| 6,421,708 | B2 | * | 7/2002 | Bettis .................... 709/217 |
| 6,442,247 | B1 | * | 8/2002 | Garcia .................. 379/88.18 |
| 6,477,240 | B1 | * | 11/2002 | Lim et al. .............. 379/67.1 |
| 6,504,915 | B1 | * | 1/2003 | Kruesi et al. ........... 379/88.18 |
| 6,545,589 | B1 | * | 4/2003 | Fuller et al. ............ 379/88.23 |

(Continued)

OTHER PUBLICATIONS

"WAV," Microsoft Computer Dictionary, Fifth Edition, Microsoft Press 2002, p. 561.*

*Primary Examiner*—Dohm Chankong
(74) *Attorney, Agent, or Firm*—Leon R. Turkevich

(57) ABSTRACT

An application server is configured for initiating a messaging session for an incoming call by accessing a subscriber profile information from a directory server and a subscriber announcement from a messaging server. The application server includes a fault tolerant routine for initiating a messaging session, enabling playing of the subscriber's spoken name during the messaging session based on a determined unavailability of the messaging server. The subscriber announcement and the subscriber's spoken name (or another audible subscriber identifier) are stored in the messaging server as first and second data files having first and second sizes, respectively, where the second size is substantially smaller than the first size. The second data file also is stored in the directory server with the subscriber profile information. If, during initiation of the messaging session the application server determines that the messaging server is unavailable, the application server retrieves the second data file from the directory server and plays the corresponding audible subscriber identifier as an alternate announcement for the messaging session. Hence, the application server is able to initiate a messaging session that provides positive identification of the subscriber, enabling messages to be recorded for storage even when the messaging server is unavailable.

40 Claims, 2 Drawing Sheets

U.S. PATENT DOCUMENTS

| | | | |
|---|---|---|---|
| 6,625,258 B1 * | 9/2003 | Ram et al. | 379/88.13 |
| 6,631,181 B1 * | 10/2003 | Bates et al. | 379/88.18 |
| 6,631,183 B1 * | 10/2003 | Rautila et al. | 379/88.22 |
| 6,691,151 B1 * | 2/2004 | Cheyer et al. | 709/202 |
| 6,769,027 B1 * | 7/2004 | Gebhardt et al. | 709/228 |
| 6,795,530 B1 * | 9/2004 | Gilbert et al. | 379/88.19 |
| 6,882,708 B1 * | 4/2005 | Bedingfield et al. | 379/88.18 |

* cited by examiner

MESSAGING SYSTEM CONFIGURED FOR SELECTIVELY ACCESSING SUBSCRIBER SPOKEN NAME FROM A DIRECTORY SERVER BASED ON DETERMINED UNAVAILABILITY OF MESSAGING SERVER

BACKGROUND OF THE INVENTION

1. Field of the Invention

The present invention relates to fault tolerant unified messaging systems configured for providing unified messaging services in an open protocol network.

2. Description of the Related Art

The evolution of the public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

Unified communications systems are under development as a way of enhancing messaging services for users such as wireless telephone subscribers. A disadvantage of unified communications systems implemented as enhanced versions of the voice mail system, paging system, or e-mail interface resident within the wireless telephone communications system is that such implementation requires detailed knowledge of the proprietary protocols associated with the voice mail systems. Hence, such implementations are available only from switch vendors having knowledge of the proprietary protocols.

Use of a unified communications system implemented independent of the existing proprietary voice mail systems, such as the commercially-available Cisco Unified Open Network Exchange (Cisco uOne) (Products UONE-FOUND 4.1S, and UONE-VOICEMSG4.1S) from Cisco Systems, Inc., enables service providers to use scalable and distributed systems using recognized communication protocols. Hence, the service providers may use such unified communications systems across multiple platforms, independent of protocol, for storage of unified messages (carrying e.g., voice messages, facsimile, and/or e-mail) stored in a centralized messaging store or distributed message stores. In particular, such unified communications systems may transfer unified messages to message stores according to a prescribed open network protocol, for example IMAP protocol via the Internet.

Commonly-assigned, copending application Ser. No. 09/480,485, filed Jan. 11, 2000, entitled Application Server Configured for Dynamically Generating Web Pages for Voice Enabled Web Applications, the disclosure of which is incorporated in its entirety herein by reference, discloses an application server that executes a voice-enabled web application by runtime execution of extensible markup language (XML) documents that define the voice-enabled web application to be executed. The application server includes a runtime environment that establishes an efficient, high-speed connection to a web server. The application server, in response to receiving a user request from a user, accesses a selected XML page that defines at least a part of the voice application to be executed for the user. The XML page may describe any one of a user interface such as dynamic generation of a menu of options or a prompt for a password, an application logic operation, or a function capability such as generating a function call to an external resource. The application server then parses the XML page, and executes the operation described by the XML page, for example dynamically generating an HTML page having voice application control content, or fetching another XML page to continue application processing. In addition, the application server may access an XML page that stores application state information, enabling the application server to be state-aware relative to the user interaction. Hence, the XML page, which can be written using a conventional editor or word processor, defines the application to be executed by the application server within the runtime environment, enabling voice enabled web applications to be generated and executed without the necessity of programming language environments.

Hence, web programmers can write voice-enabled web applications, using the teachings of the above-incorporated application Ser. No. 09/480,485, by writing XML pages that specify respective voice application operations to be performed. The XML documents have a distinct feature of having tags that allow a web browser (or other software) to identify information as being a specific kind or type of information. Hence, the XML documents define the application to be executed by the application server within the runtime environment, enabling voice enabled web applications to be generated and executed without the necessity of programming language environments.

Hence, open network-based systems such as the commercially-available Cisco uOne system (4.1S) or the system disclosed in application Ser. No. 09/480,485 enable the use of open-network systems such as IMAP message stores, or LDAP directories accessible via an IP-based network such as the Internet, enabling worldwide deployment based on IP-based access protocols. In particular, the IMAP message stores are used for storage of received messages for messaging subscribers, for example voice mail messages. IMAP message stores also are used for storage of a subscriber's spoken name (used for example when the subscriber is sending a message) and subscriber greetings to be played for a calling party attempting to reach the subscriber. The LDAP directories are optimized for providing fast response times to high volume access or search operations for read-only type operations, and typically do not implement transaction or rollback schemes as typically found in complex database systems; hence LDAP directories typically are used for storage of subscriber attribute information, including subscriber name, account information, preferences including hierarchal lists of telephone numbers for single-number reach applications, etc.

An important consideration in the deployment of open network-based systems for complex operations, such as unified messaging, is the ability to provide fault tolerant messaging services in the event that there is a server failure. In particular, proprietary based voice messaging systems may suffer a complete loss of messaging services for incoming callers if the associated messaging server, configured for storing record messages, becomes inoperable; in such cases, incoming callers cannot leave any message for a messaging subscriber, creating substantial inconvenience for the messaging subscriber.

In addition, the reliance of an IMAP messaging server for storage of personalized greetings creates problems in the event that the IMAP messaging server is unable to provide a personalized greeting during an incoming call. In particular, a messaging server may be rendered inoperable if unable to access the personalized greetings, preventing incoming callers from leaving a message for a messaging subscriber. Although a messaging server can be configured to play the called party number using text to speech resources, a calling party may be hesitant to leave a sensitive message in a voice mailbox without verifying the identity of the owner of the voice mailbox.

SUMMARY OF THE INVENTION

There is a need for an arrangement that provides fault tolerant messaging services for an incoming caller attempting to reach a messaging subscriber, even if the messaging server that stores a prescribed audible greeting for the incoming caller is unavailable.

There also is a need for an arrangement that enables a messaging server to provide a fault tolerant greeting for an incoming caller attempting to reach a messaging subscriber, even if the messaging server that stores the prescribed audible greeting is unavailable, where the incoming caller can verify an identity of a voice mailbox as corresponding to the messaging subscriber.

These and other needs are attained by the present invention, where an application server is configured for initiating a messaging session for an incoming call by accessing a subscriber profile information from a directory server and a subscriber announcement from a messaging server. The application server includes a fault tolerant routine for initiating a messaging session, enabling playing of the subscriber's spoken name during the messaging session based on a determined unavailability of the messaging server. The subscriber announcement and the subscriber's spoken name (or another audible subscriber identifier) are stored in the messaging server as first and second data files having first and second sizes, respectively, where the second size is substantially smaller than the first size. The second data file also is stored in the directory server with the subscriber profile information. If, during initiation of the messaging session the application server determines that the messaging server is unavailable, the application server retrieves the second data file from the directory server and plays the corresponding audible subscriber identifier as an alternate announcement for the messaging session. Hence, the application server is able to initiate a messaging session that provides positive identification of the subscriber, enabling messages to be recorded for storage even when the messaging server is unavailable.

One aspect of the present invention provides a method in a server configured for initiating a messaging session for an incoming call by accessing subscriber profile information from a directory server. The method includes attempting retrieval of a subscriber announcement for the messaging session from a messaging server based on the subscriber profile information, the subscriber announcement stored in the messaging server as a first data file having a first size. The method also includes determining an unavailability of the subscriber announcement for the messaging session from the messaging server, and retrieving from the directory server an audible subscriber identifier, stored in the directory server as a second data file having a second size substantially smaller than the first size, based on the determined unavailability of the subscriber announcement. The method also includes playing for the messaging session an alternate subscriber announcement including the audible subscriber identifier. Hence, the messaging session can still play an audible subscriber identifier if the messaging server cannot provide the subscriber announcement, enabling a calling party to identify the messaging session for the subscriber.

Another aspect of the present invention provides a server configured for initiating a messaging session for an incoming call. The server includes a first executable resource configured for attempting access to a messaging server according to a first open standard protocol, the messaging server configured for storing a first file having a first size and that includes a subscriber announcement for a messaging session. The server also includes a second executable resource configured for accessing a directory server, according to a second open standard protocol, for subscriber profile information, and a messaging application. The messaging application is configured for initiating a messaging session for an incoming call by retrieving the subscriber profile information and attempting retrieval of the subscriber announcement based on the subscriber profile information. The messaging application also is configured for playing for the messaging session an alternate subscriber announcement having an audible subscriber identifier, retrieved by the messaging application from the directory server as a second data file having a second size substantially smaller than the first size, based on a determined unavailability of the subscriber announcement.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

Figure 1:
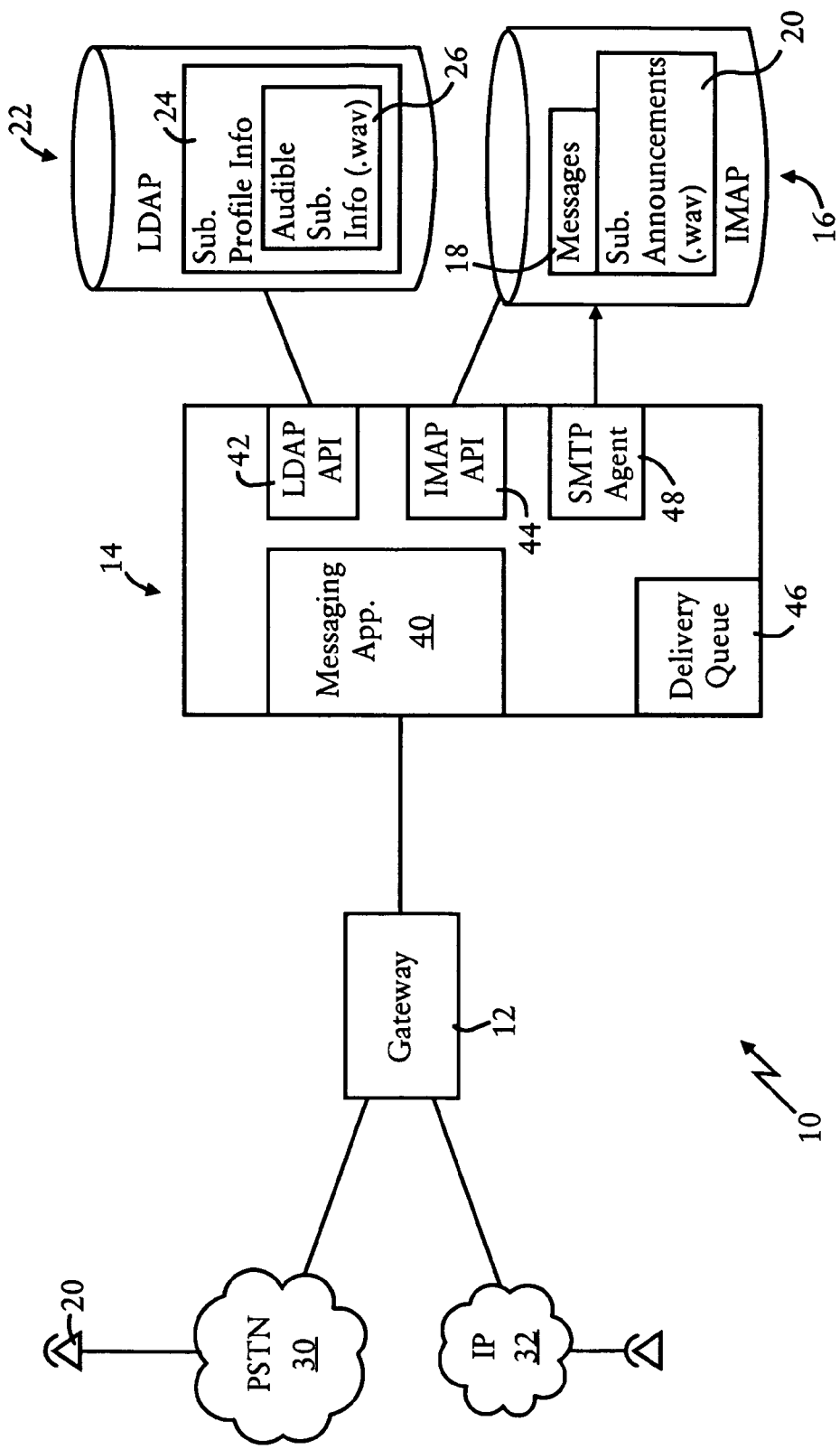
FIG. 1 is a block diagram illustrating an system enabling fault-tolerant unified messaging services according to an embodiment of the present invention.

FIG. 1 is a block diagram illustrating a messaging system 10 providing fault-tolerant messaging services for an incoming call by a calling party 20 attempting to reach the messaging subscriber, according to an embodiment of the present invention. The system 10 includes a gateway 12, an application server 14, a messaging server 16 configured for storing unified messages 18 (e.g., voice messages, e-mail messages, etc.) and subscriber announcements 20 for messaging subscribers, and a subscriber profile directory 22. As described below, the subscriber profile directory 22 is configured for storing, for each subscriber, subscriber profile information 24 that includes an alternate subscriber announcement 26 for use if the subscriber announcements 20 stored in the messaging server 16 are unavailable.

The gateway 12 is configured for receiving incoming calls from the public switched telephone network, as well as receiving voice over IP calls from the IP based network 32. An exemplary gateway 12 is an IP telephony gateway 12 such as a Cisco AS5300 Universal Access Server, configured for establishing Real Time Protocol (RTP) data stream connections according to H.323 protocol for the calling party 20; the IP telephony gateway is configured for dialing into the application server 14, configured in this example as an IP-based resource configured for establishing RTP data streams according to H.323 protocol. An exemplary implementation of the unified messaging system is the commercially available Cisco Unified Open Network Exchange (Cisco uOne) (Products UONE-FOUND 4.1S, and UONE-VOICEMSG4.1S) from Cisco Systems, Inc.

Alternately the gateway 12 and the application server 14 may communicate via HTTP protocol, where the gateway 12 includes a proxy browser configured for sending HTTP requests and receiving HTML Web pages having XML control tags for playing of media information, such as concatenated .wav files, to provide the perception of a voice messaging session to the calling party 20. Additional details related to the interaction between the gateway 12 and the application server 14 according to HTTP protocol are described in the above-incorporated application Ser. No. 09/480,485.

Regardless of the particular implementation of the communication link between the gateway 12 and the application server 14, the application server 14 is configured for initiating a messaging session for an incoming call by accessing the subscriber profile information 24 from the directory server 22 according to LDAP protocol. In particular, the application server 14 includes an executable messaging application 40, an executable LDAP resource 42 (e.g., an application programming interface (API)), an executable IMAP resource 44, a delivery queue 46, and an SMTP agent 48 configured for outputting recorded messages to the messaging server 16 for storage in the appropriate subscriber directory as a stored message 18.

The messaging application 40 is configured for initiating the messaging session for the incoming call, recording any message to be stored, and sending the recorded message to the delivery queue 46 for transfer to the appropriate subscriber mailbox 18. Typically the messaging application 40 begins the messaging session by receiving information related to the incoming call, for example the dialed number identification string (DNIS), used to identify the called party (i.e., the messaging subscriber). The messaging application 40 issues a function call to the LDAP API 42 to retrieve the subscriber profile information 24 in order to obtain subscriber preferences, for example single-number reach information, do not disturb preferences, etc., or identification of different announcements to be played depending on the call condition (e.g., busy vs. no answer, etc.).

As previously described, problems may be encountered if the stored subscriber announcements 20 cannot be retrieved for the messaging application 40 by the IMAP API 44, for example if the IMAP messaging server is unavailable. Conventional techniques for applying text to speech resources to the called party number cannot provide adequate assurances for the calling party that the correct called party has been reached.

According to the disclosed embodiment, an audible subscriber identifier 26 is stored as a data file (e.g., a .wav file) having a file size that is substantially smaller than the subscriber announcements 20 stored in the IMAP server 16. In particular, the subscriber announcements 20 may have a duration of 10 to 20 seconds, creating a data file having a substantially large size; in contrast, the audible subscriber identifier 26, for example the subscriber's spoken name, may only require a duration of about 1 to 2 seconds, resulting in a substantially smaller data file. Hence, storage of the audible subscriber identifier 26 within the subscriber profile information 24 will not provide any substantial adverse effects in the performance of the LDAP directory 22.

Figure 2:
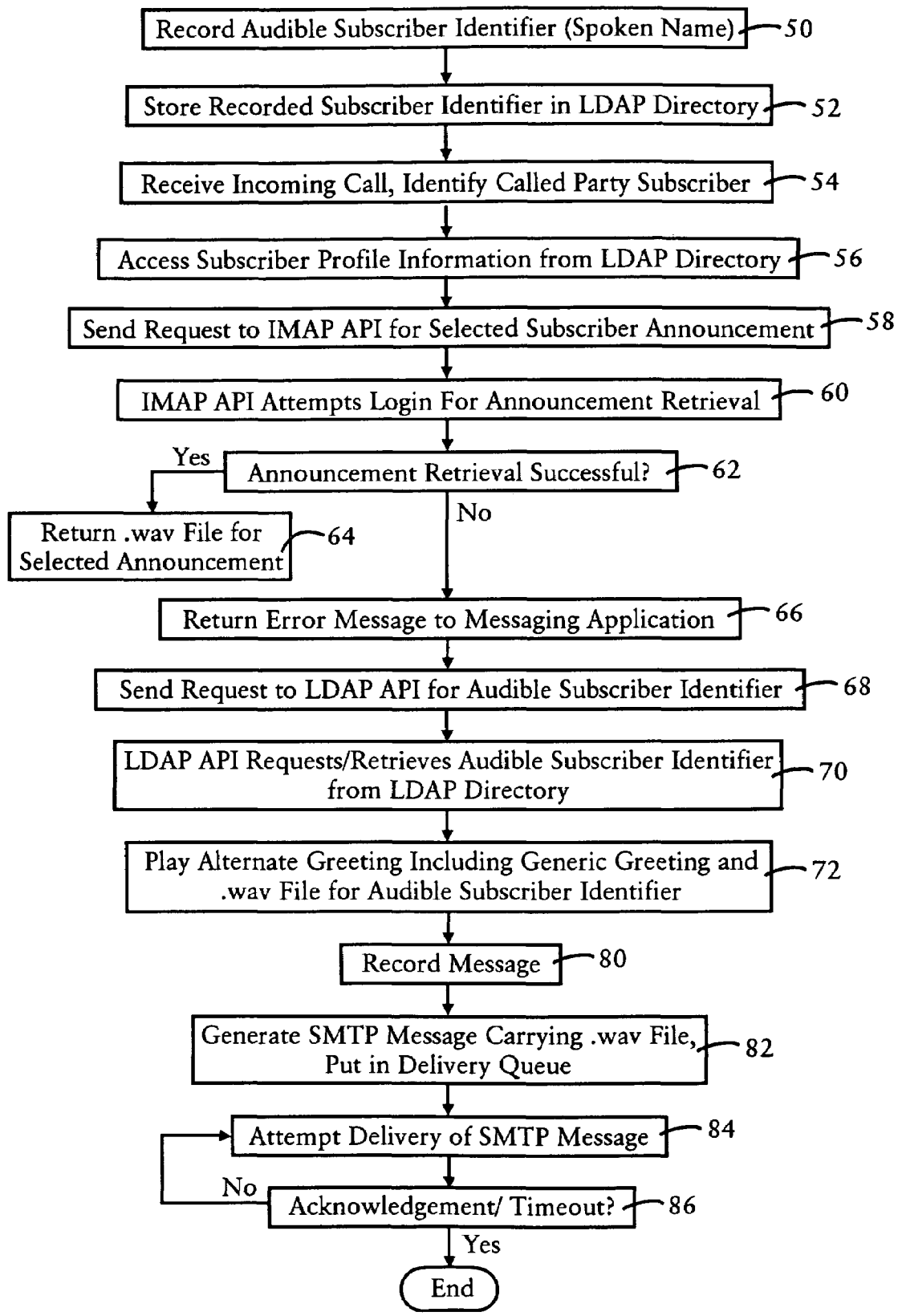
FIG. 2 is a diagram illustrating the method of providing fault-tolerant unified messaging services by selectively accessing an audible subscriber identifier from the LDAP directory of FIG. 1, according to an embodiment of the present invention.

FIG. 2 is a diagram illustrating the method of providing fault-tolerant messaging services according to an embodiment of the present invention. The steps described in FIG. 2 can be implemented as executable code stored on a computer readable medium (e.g., a hard disk drive, a floppy drive, a random access memory, a read only memory, an EPROM, a compact disc, etc.).

The method begins in step 50, where the messaging application 40 records the audible subscriber identifier, for example during a subscriber registration session, and stores in step 52 the recorded audible subscriber identifier with the subscriber profile information 24 in the LDAP directory 22. Typically the recording step 50 and the storage step 52 would be completed by the messaging subscriber before messaging services can be enabled, indicated by the appropriate enable information within the subscriber profile information 24. In addition, a copy of the audible subscriber identifier also would be stored with the subscriber announcements 20, for example if the audible subscriber identifier is needed to identify the subscriber when the subscriber is leaving a message for another messaging subscriber within the same system.

The initiation of the messaging session for an incoming call begins in step 54, where the messaging application 40 receives an incoming call and identifies the called party (i.e., messaging subscriber). The messaging application 40 accesses in step 56 the subscriber profile information 24 from the LDAP directory 22 by issuing the appropriate function call to the LDAP API 42. Upon receiving the subscriber profile information 24 retrieved by the LDAP API 42, the messaging application 40 sends in step 58 a request to the IMAP API 44 to attempt retrieval of a selected subscriber announcement (e.g., announcement for busy call, announcement for no answer, announcement for internal vs. external calls, etc.) based on prescribed logic and the specified subscriber attributes within the subscriber profile information. As apparent from the foregoing, multiple condition-specific announcements 20 may be stored within the group of subscriber announcements 20.

The IMAP API 44 attempts in step 60 to log into the IMAP messaging server 22 in order to retrieve the selected subscriber announcement. If in step 62 login was successful and the IMAP API 44 is able to retrieve the selected subscriber announcement, the IMAP API 44 returns in step 64 the selected subscriber announcement, stored as a .wav file, to the messaging application 40 for playback. However if in step 62 the subscriber announcement is determined by the IMAP API 44 to be unavailable, for example if the IMAP messaging server 16 returns a login error, the IMAP API 44 returns an error message to the messaging application 40 in step 66.

In response to receiving the error message, the messaging application 40 issues in step 68 a function call to the LDAP API 42 to request the audible subscriber identifier 26 from the LDAP directory 22. The LDAP API 42 requests and retrieves the audible subscriber identifier 26 from the LDAP directory 22 in step 70, and forwards the .wav file carrying the audible subscriber identifier 26 to the messaging application 40. The messaging application 40 then plays in step 72 an alternate subscriber announcement that includes a generic creating plus the audible subscriber identifier, enabling the calling party to confirm that the appropriate mailbox is being played.

After the messaging application 40 records the message in step 80, the messaging application generates in step 82 an SMTP message that includes the recorded message as a .wav file, and delivers the SMTP message to the delivery queue 46 for delivery to the message mailbox 18 of the subscriber. The SMTP agent periodically attempts in step 84 to deliver the SMTP message until detecting in step 86 either a delivery acknowledgment or a timeout condition (e.g., 24 hours).

According to the disclosed embodiment, messaging services can be maintained, enabling the initiation of messaging sessions for recording messages, even though a messaging server configured for storing subscriber announcements and stored messages is unavailable.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a server configured for initiating a messaging session for an incoming call by accessing subscriber profile information from a directory server, the method comprising:
    attempting retrieval of a subscriber announcement for the messaging session from a messaging server based on the subscriber profile information, the subscriber announcement stored in the messaging server as a first data file having a first size;
    determining an inaccessibility of the subscriber announcement for the messaging session from the messaging server;
    retrieving from the directory server an audible subscriber identifier, stored in the directory server as a second data file having a second size substantially smaller than the first size, based on the determined inaccessibility of the subscriber announcement; and
    playing for the messaging session an alternate subscriber announcement including the audible subscriber identifier.

2. The method of claim 1, wherein the attempting retrieval step includes attempting access to the messaging server according to Internet Message Access Protocol (IMAP).

3. The method of claim 2, wherein the attempting access step includes attempting a login procedure with the messaging server according to IMAP.

4. The method of claim 3, wherein the determining step includes determining a failure of the login procedure.

5. The method of claim 2, wherein the retrieving step includes retrieving the audible subscriber identifier from the directory server according to Lightweight Directory Access Protocol (LDAP).

6. The method of claim 5, wherein the audible subscriber identifier corresponds to a spoken name of the subscriber, the playing step including playing a generic announcement and the audible subscriber identifier as the alternate subscriber announcement.

7. The method of claim 5, wherein the second data file is a .wav file.

8. The method of claim 1, wherein the retrieving step includes retrieving the audible subscriber identifier from the directory server according to Lightweight Directory Access Protocol (LDAP).

9. The method of claim 1, further comprising:
    recording a message during the messaging session; and
    storing the message in a delivery queue for delivery to the messaging server.

10. The method of claim 9, further comprising periodically attempting delivery of the message stored in the delivery queue to the messaging server until one of a delivery acknowledgment is received, and a timeout error occurs.

11. The method of claim 1, further comprising storing in the directory server the audible subscriber identifier, at a location associated with the corresponding subscriber profile information, prior to the retrieving step.

12. The method of claim 1, wherein each of the attempting retrieval, determining the inaccessibility of the subscriber announcement, retrieving the audible subscriber identifier, and playing the alternate subscriber announcement are performed by the server.

13. A server configured for initiating a messaging session for an incoming call, the server comprising:
    a first executable resource configured for attempting access to a messaging server according to a first open standard protocol, the messaging server storing a first file having a first size and that includes a subscriber announcement for a messaging session;
    a second executable resource configured for accessing a directory server, according to a second open standard protocol, for subscriber profile information; and
    a messaging application configured for initiating a messaging session for an incoming call by retrieving the subscriber profile information and attempting retrieval of the subscriber announcement based on the subscriber profile information, the messaging application configured for playing for the messaging session an alternate subscriber announcement having an audible subscriber identifier, retrieved by the messaging application from the directory server as a second data file having a second size substantially smaller than the first size, based on a determined inaccessibility of the subscriber announcement.

14. The server of claim 13, wherein the first executable resource is configured for attempting access to the messaging server according to Internet Message Access Protocol (IMAP).

15. The server of claim 14, wherein the first executable resource is configured for attempting access to the messaging server by attempting a login procedure with the messaging server according to IMAP.

16. The server of claim 15, wherein the messaging application determines the inaccessibility of the subscriber announcement based on notification from the first executable resource that the login procedure failed.

17. The server of claim 13, wherein the second executable resource accesses the directory server for retrieval of the second data file, according to Lightweight Directory Access Protocol (LDAP), based on a retrieval request from the messaging application.

18. The server of claim 13, further comprising:
    a delivery queue for storage of a message recorded during the messaging session; and
    a delivery agent configured for attempting delivery of the message stored in the delivery queue to the messaging server for a prescribed time interval until a prescribed timeout interval has elapsed.

19. The server of claim 13, wherein the messaging application is configured for recording the audible subscriber identifier and generating the corresponding second data file, the second executable resource configured for storing the second data file in the directory server, at a location associated with the corresponding subscriber profile information.

20. The server of claim 13, wherein the subscriber announcement is stored in the messaging server, the messaging application configured for playing the alternate subscriber announcement based on the determined inaccessibility of the subscriber announcement from within the messaging server.

21. A computer readable medium having stored thereon sequences of instructions for initiating a messaging session for an incoming call by accessing subscriber profile information from a directory server, the sequences of instructions including instructions for performing the steps of:
  attempting retrieval of a subscriber announcement for the messaging session from a messaging server based on the subscriber profile information, the subscriber announcement stored in the messaging server as a first data file having a first size;
  determining an inaccessibility of the subscriber announcement for the messaging session from the messaging server;
  retrieving from the directory server an audible subscriber identifier, stored in the directory server as a second data file having a second size substantially smaller than the first size, based on the determined inaccessibility of the subscriber announcement; and
  playing for the messaging session an alternate subscriber announcement including the audible subscriber identifier.

22. The medium of claim 21, wherein the attempting retrieval step includes attempting access to the messaging server according to Internet Message Access Protocol (IMAP).

23. The medium of claim 22, wherein the attempting access step includes attempting a login procedure with the messaging server according to IMAP.

24. The medium of claim 22, wherein the retrieving step includes retrieving the audible subscriber identifier from the directory server according to Lightweight Directory Access Protocol (LDAP).

25. The medium of claim 24, wherein the audible subscriber identifier corresponds to a spoken name of the subscriber, the playing step including playing a generic announcement and the audible subscriber identifier as the alternate subscriber announcement.

26. The medium of claim 24, wherein the second data file is a .wav file.

27. The medium of claim 21, wherein the retrieving step includes retrieving the audible subscriber identifier from the directory server according to Lightweight Directory Access Protocol (LDAP).

28. The medium of claim 21, further comprising instructions for performing the steps of:
  recording a message during the messaging session; and
  storing the message in a delivery queue for delivery to the messaging server.

29. The medium of claim 28, further comprising instructions for performing the step of periodically attempting delivery of the message stored in the delivery queue to the messaging server until one of a delivery acknowledgment is received, and a timeout error occurs.

30. The medium of claim 21, further comprising instructions for performing the step of storing in the directory server the audible subscriber identifier, at a location associated with the corresponding subscriber profile information, prior to the retrieving step.

31. The medium of claim 21, wherein each of the attempting retrieval, determining the inaccessibility of the subscriber announcement, retrieving the audible subscriber identifier, and playing the alternate subscriber announcement are performed by the server.

32. A server configured for initiating a messaging session for an incoming call by accessing subscriber profile information from a directory server, the server comprising:
  means for attempting retrieval of a subscriber announcement for the messaging session from a messaging server based on the subscriber profile information, the subscriber announcement stored in the messaging server as a first data file having a first size;
  means for determining an inaccessibility of the subscriber announcement for the messaging session from the messaging server;
  means for retrieving from the directory server an audible subscriber identifier, stored in the directory server as a second data file having a second size substantially smaller than the first size, based on the determined inaccessibility of the subscriber announcement; and
  means for playing for the messaging session an alternate subscriber announcement including the audible subscriber identifier.

33. The server of claim 32, wherein the attempting retrieval means is configured for attempting access to the messaging server according to Internet Message Access Protocol (IMAP).

34. The server of claim 33, wherein the retrieving means is configured for retrieving the audible subscriber identifier from the directory server according to Lightweight Directory Access Protocol (LDAP).

35. The server of claim 34, wherein the audible subscriber identifier corresponds to a spoken name of the subscriber, the playing means configured for playing a generic announcement and the audible subscriber identifier as the alternate subscriber announcement.

36. The server of claim 34, wherein the second data file is a .wav file.

37. The server of claim 32, wherein the retrieving means is configured for retrieving the audible subscriber identifier from the directory server according to Lightweight Directory Access Protocol (LDAP).

38. The server of claim 32, further comprising:
  means for recording a message during the messaging session; and
  means for storing the message in a delivery queue for delivery to the messaging server.

39. The server of claim 38, further comprising means for periodically attempting delivery of the message stored in the delivery queue to the messaging server until one of a delivery acknowledgment is received, and a timeout error occurs.

40. The server of claim 32, further comprising means for storing in the directory server the audible subscriber identifier, at a location associated with the corresponding subscriber profile information.

* * * * *